United States Patent
Wan

(10) Patent No.: US 9,077,993 B2
(45) Date of Patent: Jul. 7, 2015

(54) METHOD OF CONVERTING A VIDEO FILE TO A GRAPHICS INTERCHANGE FORMAT IMAGE USING SAME PALETTE TABLE FOR CONSECUTIVE FRAMES

(71) Applicant: ArcSoft (Hangzhou) Multimedia Technology Co., Ltd., Hangzhou, Zhejiang Province (CN)

(72) Inventor: Wei Wan, Hangzhou (CN)

(73) Assignee: ArcSoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 88 days.

(21) Appl. No.: 13/925,792

(22) Filed: Jun. 24, 2013

(65) Prior Publication Data

US 2014/0375881 A1 Dec. 25, 2014

(51) Int. Cl.
*G06K 9/36* (2006.01)
*H04N 11/20* (2006.01)
*H04N 19/90* (2014.01)

(52) U.S. Cl.
CPC .............. *H04N 11/20* (2013.01); *H04N 19/90* (2014.11)

(58) Field of Classification Search
None
See application file for complete search history.

(56) References Cited

U.S. PATENT DOCUMENTS

| | | | |
|---|---|---|---|
| 6,912,305 B1 * | 6/2005 | Finlayson et al. | 382/162 |
| 7,483,566 B2 * | 1/2009 | Nagai et al. | 382/162 |
| 7,676,083 B2 * | 3/2010 | Nonaka | 382/167 |
| 2002/0037161 A1 * | 3/2002 | Sugahara et al. | 386/111 |
| 2004/0234140 A1 * | 11/2004 | Nonaka | 382/232 |
| 2005/0093981 A1 * | 5/2005 | Nonaka | 348/207.99 |
| 2009/0122868 A1 * | 5/2009 | Chen et al. | 375/240.22 |
| 2013/0016921 A1 * | 1/2013 | Beltowski et al. | 382/305 |

* cited by examiner

*Primary Examiner* — Sean Motsinger
(74) *Attorney, Agent, or Firm* — Winston Hsu; Scott Margo

(57) ABSTRACT

A method of converting a video file to a Graphics Interchange Format (GIF) image includes converting a plurality of frames of a video file into corresponding frames of a GIF image, creating a first palette table for defining colors in each frame of a first set of consecutive frames of the GIF image, and creating a second palette table for defining colors in each frame of a second set of consecutive frames of the GIF image, wherein the first palette table is not equal to the second palette table and each frame in the first set of consecutive frames is distinct from each frame in the second set of consecutive frames.

4 Claims, 3 Drawing Sheets

US 9,077,993 B2

METHOD OF CONVERTING A VIDEO FILE TO A GRAPHICS INTERCHANGE FORMAT IMAGE USING SAME PALETTE TABLE FOR CONSECUTIVE FRAMES

BACKGROUND OF THE INVENTION

1. Field of the Invention

The invention relates to Graphics Interchange Format Image (GIF) images, and more particularly to a method of converting a video file to become an animated GIF image in which consecutive frames of the GIF image share a same palette table for reducing the size of the GIF image.

2. Description of the Prior Art

Graphics Interchange Format Image (GIF) images have been used ever since 1987, and have been widely used on the World Wide Web since that time. GIFs are popular due to their properties of being able to use transparent backgrounds as well as for their animation effects.

An animated GIF contains two or more frames that are displayed in succession. A time delay can be specified between successive frames, and viewing the succession of frames can give the appearance of the image being animated.

The GIF format supports up to 8 bits per pixel, meaning that a single image can use a palette table that defines up to 256 colors. In an animated GIF, the same palette table can be shared for each frame within the animated GIF image, and this palette table will be referred to as a global palette. On the other hand, each frame can also be designed to have its own palette table that is not shared with other frames within the animated GIF image, and this palette table will be referred to as a local palette. Both global palettes and local palettes have their own advantages and disadvantages. Using local palettes allows the animated GIF image to have a greater number of colors since each frame can have its own color set, which improves the image quality over animated GIF images that use a global palette. In contrast, using a global palette reduces the file size of the GIF image by eliminating the need to use a separate palette for each frame of the GIF image. Having a reduced file size allows animated GIF images using global palettes to be downloaded faster than comparable animated GIF images using local palettes.

However, there exists a need for animated GIF images having improved color as compared to GIFs using global palettes and reduced file size as compared to GIFs using local palettes. Therefore, the conventional palette structure is need of modification.

SUMMARY OF THE INVENTION

It is therefore one of the primary objectives of the claimed invention to provide an improved method for converting a video file to a GIF image.

According to an exemplary embodiment of the claimed invention, a method of converting a video file to a Graphics Interchange Format (GIF) image is disclosed. The method includes converting a plurality of frames of a video file into corresponding frames of a GIF image, creating a first palette table for defining colors in each frame of a first set of consecutive frames of the GIF image, and creating a second palette table for defining colors in each frame of a second set of consecutive frames of the GIF image, wherein the first palette table is not equal to the second palette table and each frame in the first set of consecutive frames is distinct from each frame in the second set of consecutive frames.

According to another exemplary embodiment of the claimed invention, a method of converting a video file to a Graphics Interchange Format (GIF) image is disclosed. The method includes converting a plurality of frames of a video file into corresponding frames of a GIF image, and numbering each sequential frame in the GIF image with a frame number FN, wherein a first frame number in the GIF image has FN equal to one and sequential frames are numbered sequentially. The method further includes determining a value of FN modulo K, where K is an integer greater than or equal to two. A new palette table is created for defining colors for the frame in the GIF image when FN modulo K equals to one, and a previous palette table is used for defining colors for the frame in the GIF image when FN modulo K is equal to a value other than one, wherein the previous palette table used is a same palette table used for an immediately preceding frame in the GIF image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
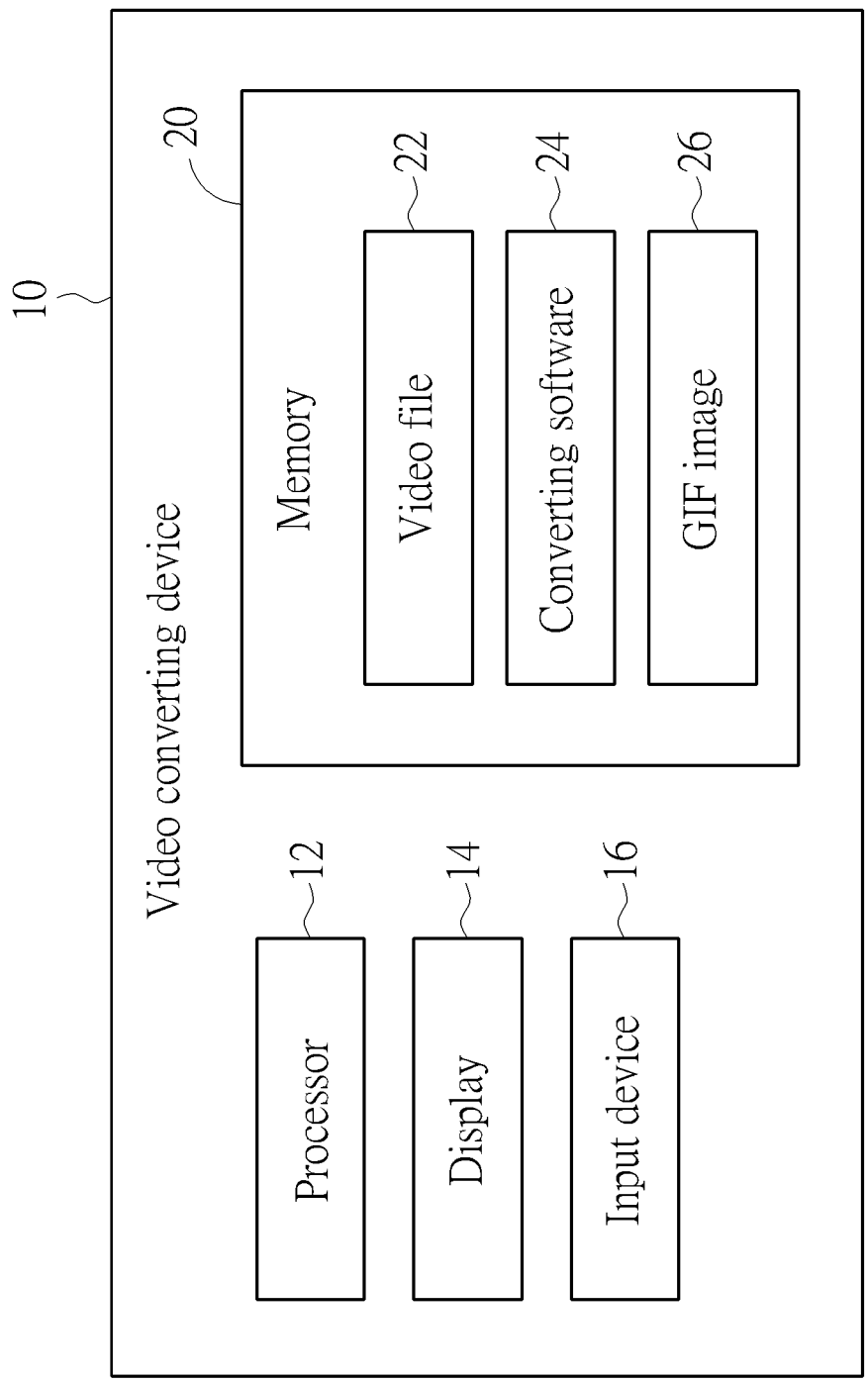
FIG. 1 is a functional block diagram of a video converting device according to the present invention.

Please refer to FIG. 1. FIG. 1 is a functional block diagram of a video converting device 10 according to the present invention. The video converting device 10 contains a processor 12 for executing software commands and controlling operation of the video converting device 10. A memory 20 stores a video file 22, converting software 24, as well as a resulting GIF image 26. The video converting device 10 also may contain an optional display 14 for showing the video file 22 or the resulting GIF image 26, and an input device 16 for allowing a user to control the video converting device 10.

The present invention seeks to create animated GIFs containing a palette table that combines the benefits of both a global palette and local palettes. This is accomplished by having consecutive frames of the animated GIF share the same palette table. When converting the video file 22 to become the GIF image 26, consecutive frames of the video file 22 are often very similar to one another. Because of this, the consecutive frames share many common colors. The same is true for the GIF image 26 that results from the conversion of the video file 22 to the GIF image 26. Since adjacent frames in the GIF image 26 are quite similar to one another, the colors used in consecutive frames will be nearly the same. The present invention takes advantage of this fact by creating what is referred to as an "interlaced palette". The interlaced palette is a palette table that is used by two or more consecutive frames of the GIF image 26. The number of consecutive frames that will use the same palette table will be referred to as K, where K is a constant integer that is greater than or equal to two. The user of the video converting device 10 may set the value of K to be different values, such as 2, 3, 4, and so on. In general, adjusting the value of K produces a tradeoff between adjusting the file size of the resulting GIF image 26 and the color quality of the resulting GIF image 26. This tradeoff is similar to the tradeoff experienced when using a global palette versus using local palettes. In general, a smaller value of K will produce larger file sizes and better color quality than a larger value of K.

Figure 2:
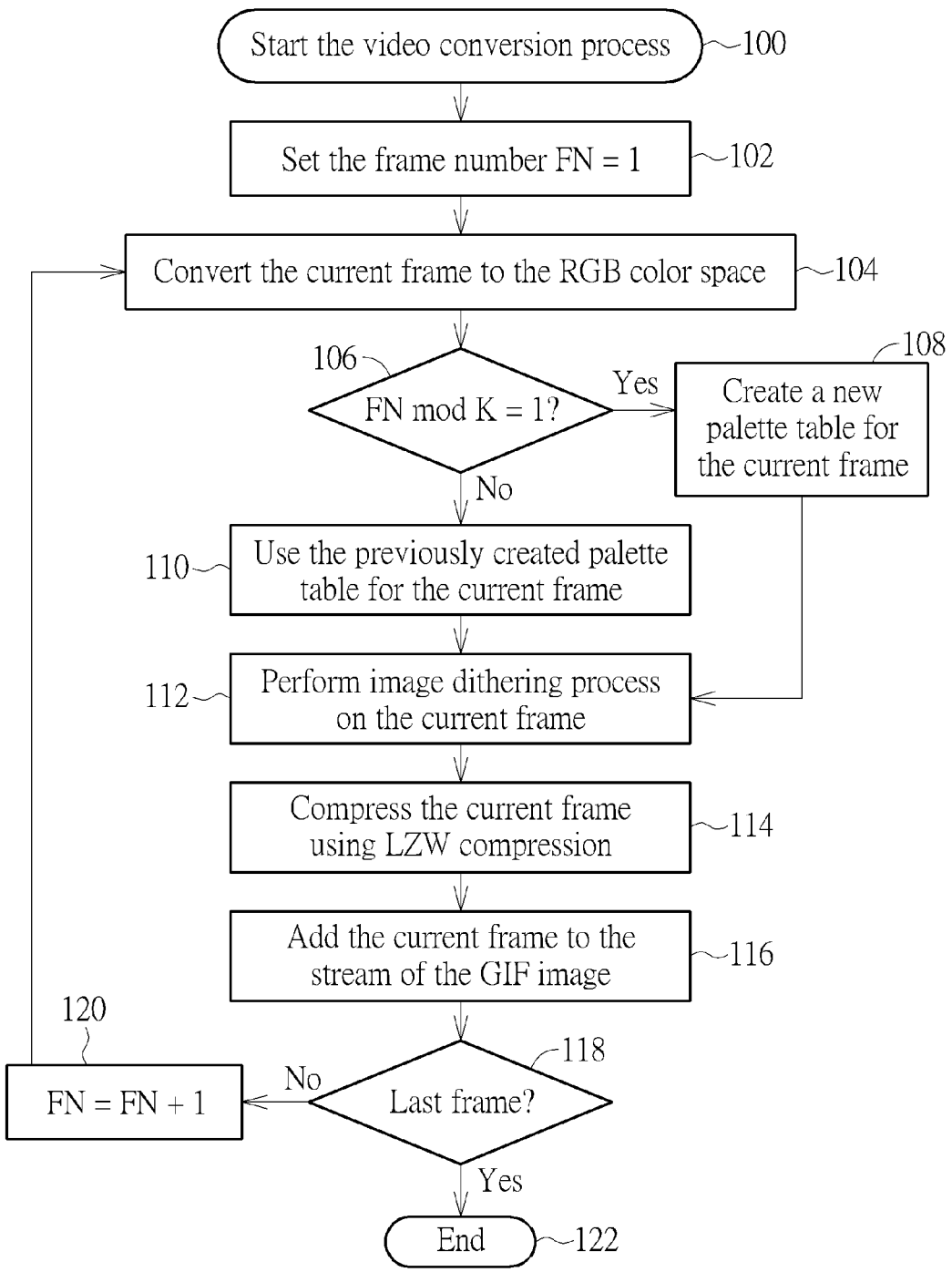
FIG. 2 is a flowchart describing the method of converting the video file to a GIF image according to the present invention.

Please refer to FIG. 2. FIG. 2 is a flowchart describing the method of converting the video file 22 to a GIF image 26 according to the present invention. Steps in the flowchart will be explained as follows.

Step 100: The user of the video converting device 10 starts the video conversion process for converting the video file 22 to become the animated GIF image 26. Frames of the video file 22 will become frames of the GIF image 26, although there does not need to be an exact one-to-one correspondence of frames in the video file 22 to frames in the GIF image 26. Frames of the video file 22 can be left out for reducing the size of the GIF image 26.

Step 102: Starting with the first frame in the GIF image 26, assign a frame number FN for each sequential frame in the GIF image 26. Thus, the first frame will have the frame number FN equal to one. Each subsequent frame will have a frame number FN equal to the frame's location in the GIF image 26. For instance, the second frame will have FN equal to two, the third frame will have FN equal to three, and so on.

Step 104: Convert the current frame to be an image in the RGB color space.

Step 106: Determine whether the value of FN modulo K is equal to one. The modulo operation is often abbreviated as "mod" in mathematics. When FN mod K=1, go to step 108. This represents that the current frame is the start of a new set of frames that will use a new palette table. Otherwise, go to step 110.

Step 108: Create a new palette table for the current frame for defining colors for the current frame. This new palette table will also be shared by at least one other frame immediately following the current frame. Go to step 112.

Step 110: Use the previously created palette table for the current frame. The previously created palette table is the same palette table used for the immediately preceding frame in the GIF image 26.

Step 112: Perform an image dithering process on the current frame, if desired. The image dithering process is used to create the illusion of color depth in the current frame, and is used to compensate for the limited number of colors available in the palette table used by the current frame.

Step 114: Compress the current frame by using a Lempel-Ziv-Welch (LZW) lossless data compression technique to reduce the file size of the current frame without degrading the visual quality.

Step 116: Add the current frame to the stream of the GIF image 26.

Step 118: Determine if the current frame is the last frame in the GIF image 26. If so, go to step 122. If not, go to step 120.

Step 120: Increment the value of FN by one since the next frame in the GIF image 26 will now become the current frame being operated on. Go to step 104.

Step 122: End.

Figure 3:
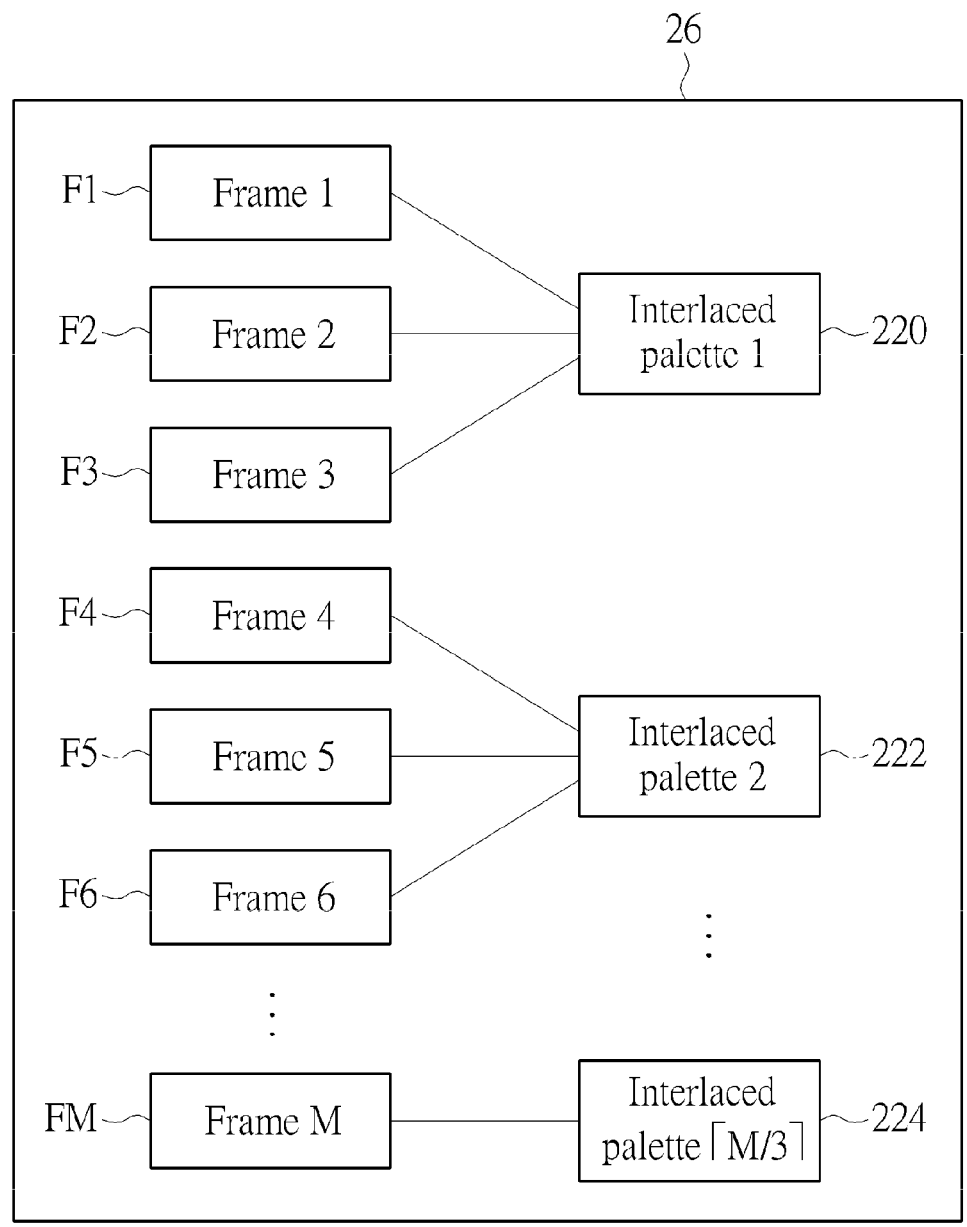
FIG. 3 is an example of the present invention method of using the same palette table for K consecutive frames of the GIF image when K is equal to three.

Please refer to FIG. 3. FIG. 3 is an example of the present invention method of using the same palette table, referred to as an interlaced palette, for K consecutive frames of the GIF image 26 when K is equal to three. For simplicity, only some of the frames in the GIF image 26 are shown. A first frame F1, a second frame F2, a third frame F3, a fourth frame F4, a fifth frame F5, a sixth frame F6, and an Mth frame FM are shown, where the Mth frame FM is not necessarily adjacent to the sixth frame F6, and M is an integer greater than or equal to two and also greater than K. Since K is equal to three, every set of three consecutive frames of the GIF image 26 will use the same interlaced palette. The first, second, and third frames F1, F2, and F3 will use a first interlaced palette 220. The fourth, fifth, and sixth frames F4, F5, and F6 will use a second interlaced palette 222. The Mth frame FM will use a last interlaced palette. If there are M frames in the GIF image 26, and K is equal to three, then the number of interlaced palettes used will be equal to ⌈M/3⌉, where the ceiling function of M/3 represents the smallest integer greater than or equal to the value of M/3. For example, if M was equal to any of the values seven, eight, or nine, then there would be a total of three interlaced palettes used in the GIF image 26. As another example, if M was equal to ten, then there would be a total of four interlaced palettes used in the GIF image 26. Please keep in mind that this value of "3" would be replaced by whatever value of K is being used for the GIF image 26.

The simple calculation of determining when the frame number FN of the current frame divided by K has a remainder equal to 1, or FN mod K=1, will determine whether a new interlaced palette should be used or not. In the above example of FIG. 3, the first frame F1 and the fourth frame F4 have a value of FN mod K=1. Thus, a new interlaced palette is created when processing the frame of each of the first frame F1 and the fourth frame F4. When processing the second frame F2, the third frame F3, the fifth frame F5, and the sixth frame F6, these frames will use the same interlaced palette as the frame immediately that immediately precedes it.

The first interlaced palette 220 can be chosen based on the colors of only the first frame F1 for simplicity. The second frame F2 and the third frame F3 will then use the same colors present in the first interlaced palette 220. In other embodiments, the colors of the first interlaced palette 220 will be chosen based on all of the first frame F1, the second frame F2, and the third frame F3 considered as a whole.

In summary, the present invention uses an interlaced palette for consecutive frames of an animated GIF image, thereby reducing the number of palette tables needing to be used for the animated GIF image and reducing file size while at the same time still providing high color quality. The present invention takes advantage of the fact that consecutive frames of the animated GIF image are similar to one another, which reduces the number of unique colors needed for each set of consecutive frames.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of converting a video file to a Graphics Interchange Format (GIF) image, the method comprising:

converting a plurality of frames of a video file into corresponding frames of a GIF image;

numbering each sequential frame in the GIF image with a frame number FN, wherein a first frame number in the GIF image has FN equal to one and sequential frames are numbered sequentially;

calculating a value of FN modulo K, where K is an integer greater than or equal to two;

creating a new palette table for defining colors for the frame in the GIF image when FN modulo K equals to one; and using a previous palette table for defining colors for the frame in the GIF image when FN modulo K is equal to a value other than one, wherein the previous palette table used is a same palette table used for an immediately preceding frame in the GIF image.

2. The method of claim 1, wherein K is equal to three.

3. The method of claim 1, wherein when converting the plurality of frames of the video file into corresponding frames of the GIF image, the frames of the GIF image are converted into frames in the RGB color space.

4. The method of claim 3, wherein each frame of the GIF image is dithered and compressed after being converted to frames in the RGB color space.

* * * * *